United States Patent [19]

Johnson et al.

[11] 3,803,565

[45] Apr. 9, 1974

[54] PLATED WIRE MEMORY PLANE

[75] Inventors: Wendell C. Johnson, Topanga Canyon; Nicolas G. Gomez, Los Angeles; Claude H. Foret, Culver City, all of Calif.

[73] Assignee: Xerox Corporation, Stamford, Conn.

[22] Filed: Nov. 21, 1972

[21] Appl. No.: 308,367

Related U.S. Application Data

[62] Division of Ser. No. 106,839, Jan. 15, 1971, Pat. No. 3,722,083.

[52] U.S. Cl. 340/174 PW, 340/174 TF, 340/174 VA

[51] Int. Cl. .......................... G11c 11/14, G11c 11/04

[58] Field of Search .............. 340/174 PW, 174 VA; 29/604

[56] References Cited

UNITED STATES PATENTS 3,656,127 4/1972 Reid .............................. 340/179 VA

*Primary Examiner*—James W. Moffitt

[57] ABSTRACT

A plated wire memory plane includes a support member, an insulator having a plurality of parallel grooves, a plated wire comprising a conductive wire substrate, an annular magnetic coating uniformly deposited in generally all of the preformed grooves, and a substantially U-shaped word drive line laminate. One leg of said word drive line laminate is positioned between the grooved insulator and the support member. The second leg of the word drive line laminate is positioned to overlie the upper surface of the grooved insulator.

9 Claims, 7 Drawing Figures

PLATED WIRE MEMORY PLANE

This is a division of application Ser. No. 106,839, filed Jan. 15, 1971; and now U.S. Pat. No. 3,722,083.

BACKGROUND OF THE INVENTION

This invention relates to magnetic storage memories. Specifically, this invention relates to an improved plated wire memory plane and methods and means for decreasing the time in which it takes to load plated wire storage elements into preformed grooves or tunnels in the memory plane and reducing the amount of manual handling of the plated wire storage elements.

Magnetic memory devices of the plated wire type are based upon a memory element comprising a cylindrical magnetic film electroplated onto a conductive wire substrate. Conventionally, the wire substrate is made of copper-beryllium wire having a diameter of about 5 mils having electroplated thereon an 81% nickel-19% iron alloy having a thickness of about 10,000A. During fabrication of the memory element, easy and hard axes of magnetization are established in the magnetic film. Generally, the easy axis is circular about the axis of the wire substrate (i.e., perpendicular to the longitudinal axis of the wire substrate) while the hard axis is parallel to the longitudinal axis of the wire. Within the easy axis plane, the magnetic film is capable of having two stable magnetization states induced therein, i.e., either clockwise or counter-clockwise about the axis of the wire. These two stable states conventionally represent a binary "1" and "0." Such a memory element is described by T. R. Long, Journal of Applied Physics, Vol. 31, Supplement to Issue No. 5, pages 123S and 124S (May, 1960).

The plated wire memory planes include a number of such plated wires and a plurality of conductive word drive lines arranged to overlie or partially encircle the plated wires in a perpendicular, or grid-like, fashion. At each point where a word drive line spatially intersects a plated wire, there is defined a bit storage location. In addition to the aforementioned elements, bit drives and read amplifiers are connected to the plated wires, in accordance with techniques well known in the art, to complete the memory plane. Such a plated wire memory plane is described by Fedde, Sperry Engineering Review, pages 19–22 (Fall, 1965).

Information is written into the bit storage location by the time coincident application of a current through the word drive lines (generating a hard axis field) and a bit or steering current applied to the wire substrate (generating an easy axis field). The polarity of the bit or steering current (i.e., the current along the wire substrate) which establishes the direction of the easy axis field determines whether a binary "1" or "0" is written into the bit storage location. The information in the bit storage location is interrogated by applying a current pulse to the word drive lines (i.e., applying a hard axis, read field substantially at right angles to the easy axis of magnetization) to cause the magnetic vector to rotate toward the hard axis. The polarity of the voltage pulse detected along the wire substrate indicates the nature of the information previously stored in the bit storage location. In the non-destructive read-out mode, the magnetic vector collapses back to its original vector line within the easy axis plane upon removal of the reading field, whereby the information previously stored in the bit storage location is retained.

The information stored in the bit storage location can be changed to the other form of binary information by the time coincident application of a hard axis field (by passing current through the word drive lines) and an easy axis field which is opposite to the original direction of the magnetic vector line representing the initially-stored information. Upon removal of the hard and easy axis fields, the magnetic vector collapses to the closest stable magnetization state whereby a 180° change in the orientation of the easy axis magnetic vector occurs (i.e., a change in the binary information stored in the bit storage location has been made).

One of the problems associated with such memory planes is the lengthy manual procedure for inserting the plated wires into the grooves in the supporting matrix. Not only is this manual process costly, because it is inherently time-consuming, but it readily lends itself to damage of the plated wires, for example by bending, with attendant change in the magnetic properties of the magnetic coating. It would, therefore, be desirable to have an improved method and means for rapidly facilitating the insertion of the plated wires into the preformed grooves in the insulator matrix with lessened possibility for damage to the magnetic coating as the plated wires are being inserted.

OBJECTS OF THE INVENTION

It is, therefore, the primary object of the present invention to provide an improved plated wire memory plane.

It is a further object of the present invention to provide an improved plated wire memory plane which facilitates the insertion of the plated wires into preformed grooves in an insulator matrix associated therewith.

It is a further object of the present invention to provide an improved memory plane having a preformed groove-containing insulator matrix which extends, in a longitudinal sense, beyond at least one end of an overlying word drive line matrix, such that, during insertion, the plated wires are caused to contact the uncovered ends of the grooves at a slight angle to the horizontal whereby insertion of the plated wires is readily facilitated.

It is a further object of the present invention to provide means for rapidly and without damage inserting plated wires into preformed grooves in a plated wire memory plane.

It is a further object of the present invention to provide means for rapidly inserting plated wires into preformed grooves in a plated wire memory plane with lessened possibility for damage to the magnetic coating on the plated wire.

Yet a still further object of the present invention is to provide a novel process for inserting plated wires into a plated wire memory plane.

Yet a still further object of the present invention is to provide a novel process for inserting plated wires into a plated wire memory plane wherein the plated wires are caused to contact the uncovered ends of grooves in a preformed insulator matrix at a slight, acute angle to the horizontal whereby insertion of the plated wires is readily facilitated without damage to the plated wires.

Yet a still further object of the present invention is to provide an improved process for inserting plated wires into a plated wire memory plane wherein slight differences in elevation or angle of the plated wire carrier are not as critical as corresponding elevational differences if the plated wire carrier was horizontally aligned with the preformed grooves in the memory plane.

These and still further objects, features and advantages of the present invention will become apparent upon consideration of the following detailed disclosure.

BRIEF SUMMARY OF THE INVENTION

These and still further objects, features and advantages of the present invention are achieved, in accordance therewith, by providing a plated wire memory plane including a support member, an insulator having a plurality of parallel grooves formed therein, a plated wire comprising a conductive wire substrate and an annular magnetic coating uniformly deposited thereon in certain, generally all, of the preformed grooves, and a substantially U-shaped word drive line laminate, one leg of said word drive line laminate being positioned between the grooved insulator and the support member with the second leg of the word driver laminate being positioned to overlie the upper surface of the grooved insulator. The word drive line laminate comprises a flexible support member having a plurality of conductive word drivers formed on one surface thereof. The word drive line is conventionally formed on that surface of the flexible support most closely adjacent the plated wires (i.e., they are not separated from the plated wires by the support). As is conventional in the art, the word drive line laminate, having the word drive line thereon, is positioned so the longitudinal axes of the word drive line is perpendicular to the longitudinal axes of the plated wires, whereby numerous bit storage locations are defined.

To facilitate the insertion of the plated wires into the memory plane, the grooved insulator extends, in a longitudinal sense, beyond the boundary of at least one end of the word driver laminate. Accordingly, the ends of the grooves, into which the plated wires are to be inserted, are exposed. During insertion of the plated wires, the leading ends of the plated wires are caused to contact the exposed ends of the grooves at a slight, acute angle to the plane of the grooves whereby, with continued urging, the plated wires are rapidly, easily and with essentially no damage fully inserted into the grooves.

The device for inserting the plated wires into the memory plane described above includes means for supporting the memory plane, means for supporting a plated wire carrier having a plurality of longitudinal grooves in registration with the grooves in the insulator member associated with the memory plane, certain of the grooves in the wire carrier having plated wires therein, means to withdraw the plated wires from the wire carrier and to insert the plated wires into the corresponding grooves in the insulator member which are in registration therewith, and means to position the wire carrier support means at a slight, acute angle with respect to the plane of the grooves whereby the plated wires as they are being withdrawn from the wire carrier and inserted into the memory plane are caused to contact the exposed ends of the grooves in the insulator member in the memory plane at said slight, acute angle whereby, under continued urging of the insertion means, the plated wires are gently and easily, without damage, inserted into the memory plane.

The wire carrier is so positioned that the ends of the plated wires being withdrawn therefrom contact the exposed ends of the grooves in the insulator member at a slight, acute angle thereto. Thus, as the plated wires are mass loaded into the memory plane, the leading ends of the plated wires see a much longer target as compared to the situation where the wire carrier and the memory plane abut each other along the same plane. Assuming that the plated wires properly contact the exposed ends of the grooves in the insulator member, variations, not in the angle of approach, but in the point of contact of the ends of the plated wires within the exposed groove ends are not as critical as corresponding elevational differences if the grooved wire carrier is aligned in the same plane, for example a horizontal plane, with the grooved insulator. For example, if aligned on the same plane, a slight elevational difference might cause the plated wires to come into contact with the end portions of the grooved insulator or the end portions of the overlying word drive line laminate, each of said end portions presenting surfaces perpendicular to the path of travel of the plated wires. If the plated wires contacted such surfaces, the resultant bending would cause damage to the magnetic properties of the thin magnetic coating on the plated wires so affected, with the result that, at some subsequent time, the plated wire memory plane might become erratic in operation. This is avoided, in accordance with the present invention, by positioning the wire carrier, having the plated wires therein, with respect to the grooves in the insulator member such that the plated wires are caused to contact the exposed ends of the receiving grooves at a slight, acute angle with respect to the plane of the grooves whereby, under urging of the insertion means, the plated wires are gradually withdrawn from the wire carrier and gradually and without significant bending inserted into the memory plane.

The insertion means comprises an automatically or manually operated roller mechanism which contacts the upper surface of each of the plated wires and urges them, in mass, from the plated wire carrier into the memory plane. Since the plated wires are loaded in mass, loading time is decreased significantly since all that is required is the positioning of the wire carrier with respect to the memory plane and the rotation of the roller mechanism until the plated wires are fully inserted. Once the carrier is positioned, all of the plated wires can be inserted in a matter of seconds. Furthermore, once the adjustments are made for the insertion of the plated wires into the first memory plane, they need not be change for subsequent loadings whereby even further savings in time is achieved. Additionally, since the operator does not contact the magnetic surface of the plated wires during transfer from the wire carrier to the memory plane, the plated wires do not pick up dirt, moisture, etc. from the operator nor are they subjected to possible damage as might be occasioned during a manual transfer operation. Either of these latter two features can cause undesirable variations in the magnetic properties of the plated wire which, in turn, might cause subsequent erratic operation of the memory plane. This is avoided by the present invention wherein the plated wires are mechanically inserted into the grooves in the memory plane without actual handling thereof by the operator and with minimum possibility of damage, as by bending, during the insertion step.

Thus, the improved process for fabricating the memory plane of the present invention includes the proper positioning of the wire carrier, having the plated wires therein, with respect to the plane of the grooved insulator such that the plated wires held by the wire carrier, upon withdrawal therefrom, are caused to contact the exposed ends of the grooves in the memory plane at a slight, acute angle with respect to the plane of the grooves whereby bending and manual handling of the plated wires is eliminated. Additionally, as indicated above, mass insertion of the plated wires in the manner described above not only lessens the possibility of inadvertent damage to the plated wires but achieves a significant reduction in the costs associated with the assembly of plated wire memory planes of the type contemplated herein.

BRIEF DESCRIPTION OF THE DRAWINGS

The nature of the invention will be more easily understood when it is considered in conjunction with the accompanying drawings wherein:

Referring to FIGS. 1 and 2, there is seen a plated wire memory plane 10 having an epoxy glass board as support member 12, a thermoset insulator 14 having a plurality of grooves or tunnels 16 formed in the surface thereof remote from support 12, and a substantially U-shaped word drive line laminate 18 having one leg 20 positioned between support 12 and grooved insulator 14 and the other leg 22 positioned in overlying relationship with the upper, non-continuous surface 24 of insulator 14. Word driver laminate 18 comprises a flexible support member 26 having formed, on the surface thereof most closely adjacent grooved insulator 14, a plurality of conductive word drive lines 28. As is conventional in this art, the axes of the word drivers 28 are perpendicular to the longitudinal axes of grooves 16 whereby, at the spatial intersections thereof, numerous bit storage locations are defined.

Support member 12 can itself be supported by a further support member, for example a flat aluminum plate, and, if desired, a second memory plane, having a similar or exact structure as described above, can be secured to and supported by the bottom surface of such a further support member. Appropriate adhesive layers (not shown) are provided to bond adjacent elements of the memory plane securely together.

Figures 1, 2, 3:
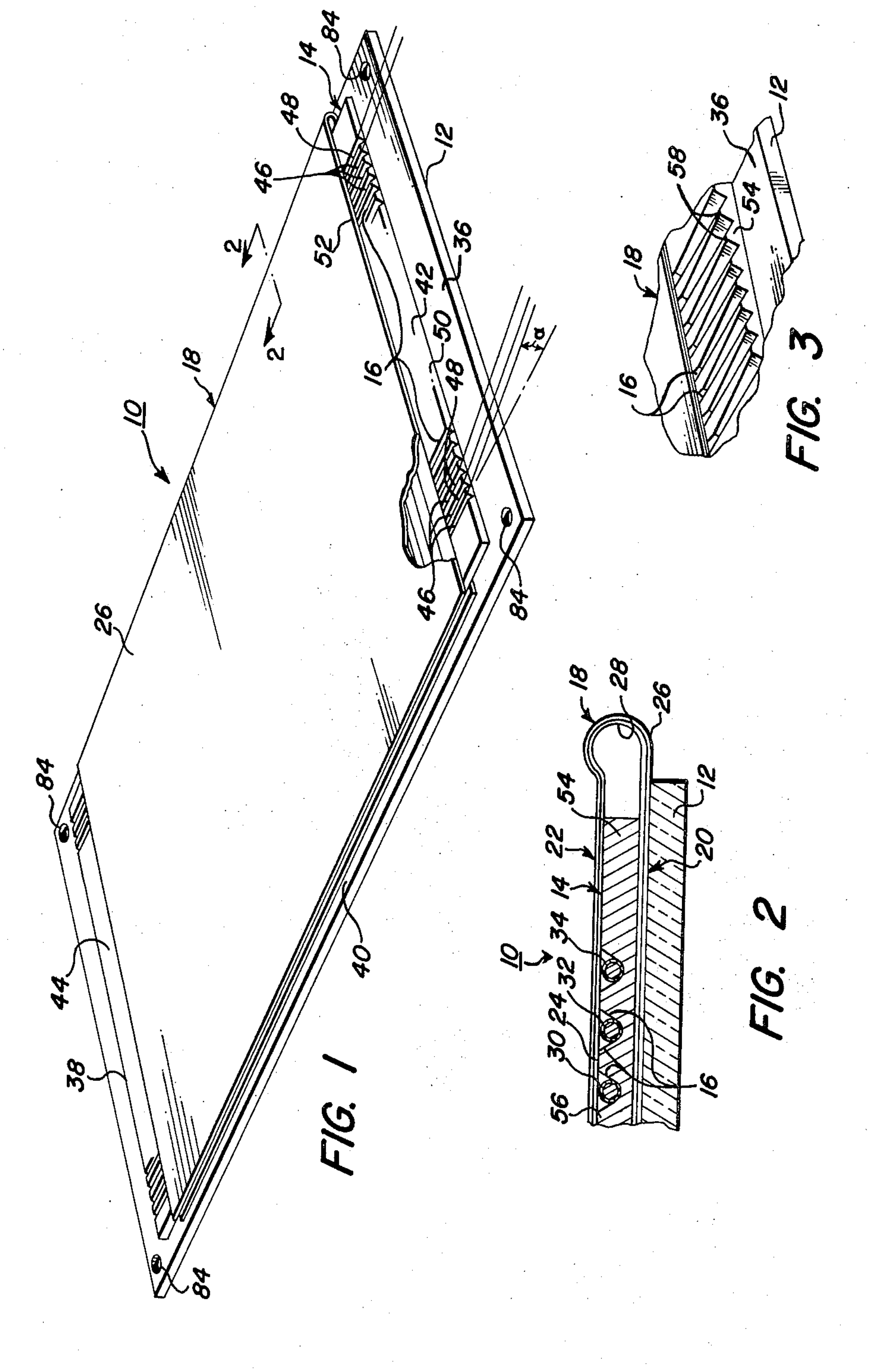
FIG. 1 is a perspective end view of the improved plated wire memory plane of the present invention.
FIG. 2 is a side sectional view of a portion of the memory plane of FIG. 1 taken along line 2—2 of FIG. 1.
FIG. 3 is a fragmentary perspective end view of an alternate form for the exposed ends of the preformed grooves in a memory plane produced in accordance with the present invention.

As can best be seen in FIG. 2, in the finally assembled memory plane, a plated wire 30 is inserted into certain, generally all, of the grooves 16. Also as is well known in the art, the plated wire can comprise a 5 mil diameter copper-beryllium wire core 32 having a 10,000 A ferromagnetic coating 34 of 81% nickel-19% iron uniformly deposited on the outer surface threof. If desired, a plated wire having a 10,000 to 20,000 A thick intermediate coating of copper between ferromagnetic coating 34 and copper-beryllium wire core 32 can be utilized.

Support member 12 has exposed end portions 36 and 38 and exposed side portion 40 on which appropriate electrical contacts (not shown can be positioned, as is known in this art, for the connection of the numerous plated wires 30 and the numerous word drive lines 28 to current drive and sense means.

In accordance with the present invention, as can best be seen in FIG. 1, grooved insulator 14 extends longitudinally beyond the ends of word driver laminate 18 to expose end portions 42 and 44 thereof. It follows that the longitudinal ends 46 of grooves or tunnels 16 are also exposed (i.e., they are not covered by leg 22 of word drive line laminate 18). As shown in FIG. 1, the leading edges 48 of plated wires 30 are caused during insertion, to contact the exposed ends 46 of grooves or tunnels 16 at a slight, acute angle $\alpha$ to the plane of the grooves, which generally, is horizontal, whereby with continued urging, the plated wires are gradually, easily and without damage fully inserted into the grooves until the leading ends 48 extend out from beneath leg 22 of word drive line laminate 18 adjacent grooved end portion 44 of insulator 14. Because the plated wires are caused to contact exposed groove ends 46 at a slight, acute angle, and have a relatively long target in which to make such contact (extending essentially from edge 50 of insulator 14 to edge 52 of word driver laminate 18), slight variations in the actual point of contact of the plated wires are not critical, assuming that each plated wire hits the groove into which it is being inserted along exposed portion 42. Furthermore, since the plated wires are initially being inserted at a slight, acute angle, there is less possibility of the plated wires hitting surface 54 of insulator 14 or surface 56 of word drive line laminate 18 during insertion. In prior assembly procedures, if a plated wire hit such surfaces, the bending of the wire which resulted could cause undesirable changes in the magnetic properties of the magnetic coating on the plated wire. This required that the particular plated wire element so bent be discarded. If the bent plated wire was not discarded but instead inserted into the memory plane, any changes in the magnetic properties might, at some later date, result in erratic operation of the memory plane. This is avoided in the present invention by initially inserting the plated wires at an acute angle with respect to an elongated target (i.e., the exposed ends 46 of grooves 16 in insulator 14) such that the plated wires are guided, without bending, into the proper grooves. Since the plated wires are not bent to an undesirable extent during insertion, the magnetic properties are not adversely affected whereby one cause for erratic operation of memory planes of this type is virtually eliminated.

The acute angle of insertion should be within the range of about 0° to 65° and preferable within the range of about 3° to 20°. The optimum value for the acute angle of insertion is about 8°.

Referring to FIG. 3, there is seen an alternate form for the exposed ends 46 of grooves 16. Specifically, grooves 16 are flared outwardly from those portions of grooves 16 underlying word driver laminate 18 toward surface 54 of insulator 14. Exposed flared end portions 58 offer not only elongated but wider targets for the plated wires as they are being inserted into the memory plane.

Referring to FIGS. 4–7, there is seen a device 60 for loading the plated wires 30 held by wire carrier 62 into memory plane 10. Base 64 has mounted on the upper surface 66 thereof, adjacent the lefthand end, means 68 to support memory plane 10 in the desired position. Specifically, vertical columns 70 and 72, secured at each lower end thereof to surface 66, support, adjacent the upper ends thereof, horizontal member 74. Member 74 is hinged for rotational movement about hinge 76 at the upper end of column 70. Secured at each longitudinal end of member 74 are further vertical supports 78 and 80 adapted to have the bottom surfaces of memory plane support 12 accurately aligned thereon. This is achieved by having alignment pins 82 extending above the upper surfaces of columns 78 and 80 adjacent each of the four, upper corners of support means 68. Memory plane 10 is accurately aligned by causing the upper extended portions of pins 82 to pass through holes 84 in each of the four corners of memory plane support 12. After the memory plane is properly aligned on support means 68, the plane thereof is adjusted by means of set screw 84, the lower end 86 of which is adapted to rest on the top 88 of column 72. By rotating set screw 84, member 74 is caused to rotate about hinge 76 whereby the righthand end of memory plane 10 is raised or lowered. Normally, the memory plane is aligned essentially in a horizontal plane.

Figure 4:
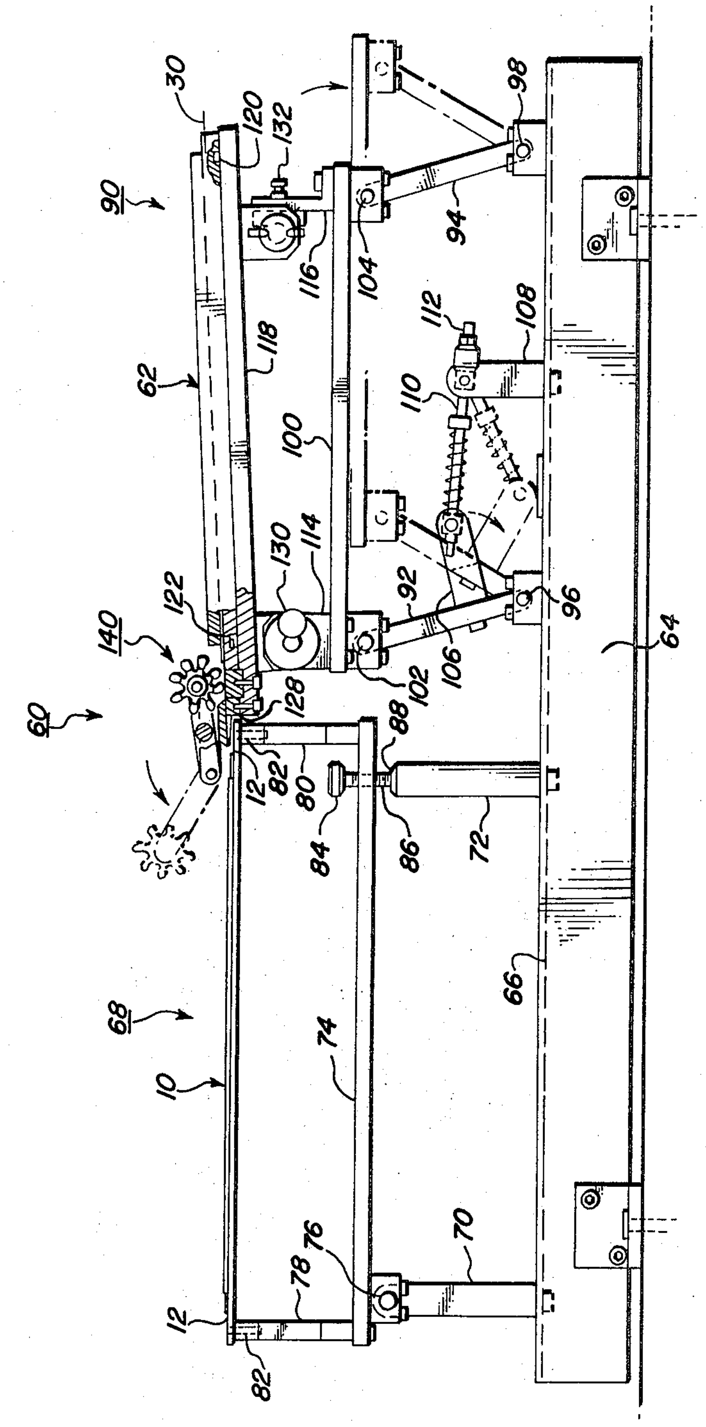
FIG. 4 is a side elevational view, partially in section, of the device of the present invention for inserting the plated wires into the memory plane.

Adjacent the righthand end of device 60 is means 90 for supporting wire carrier 62 in the desired position so the plated wires, upon insertion, contact exposed ends 46 of grooves 16 at the desired angle. In FIG. 4, means 90 is shown in phantom in the position where the wire carrier is loaded onto the support means and in heavy outline in the position where the plated wires in carrier 62 are fed into the aligned grooves in memory plane 10. Vertical beams 92 and 94 hinged for rotational movement about hinges 96 and 98, respectively, support horizontal member 100 adjacent upper hinges 102 and 104, respectively. Arm 106 on beam 92 is connected to immovable support 108, on base 64, by means of shaft 110. Through adjustment of set screw 112 the forward position of support means 90 and, accordingly, wire carrier 62, can be controlled. Vertical members 114 and 116 mounted on member 100 support wire carrier support 118. Alignment pins 120 cooperate with recesses 122 in the bottom wall of wire carrier 62 to enable the wire carrier to be properly aligned on support 118. Lateral positioning of grooves 124 in carrier 62 with respect to tapered grooves 126 in guide members 128 and grooves 16 in memory plane 10 is made by adjusting set screw 130. Vertical adjustment of the righthand end of support 118 is made by adjusting set screw 132 whereby the desired angle of approach of plated wires 30 from wire carrier 62 into memory plane 10 can be selected.

Disposed between memory plane support means 68 and wire carrier support means 90 above the path of travel of the plated wires into memory plane 10, there is a roller mechanism 140 adapted to contact the upper surfaces of plated wires 30 carried by wire carrier 62 and urge them, upon rotation thereof, into the grooves in the memory plane. With the orientation established in FIGS. 4–6, rotation of roller mechanism 140 in a clockwise direction causes the plated wires to be withdrawn from grooves 124 in wire carrier 62, passed over the upper surface 142 of flat guide member 144, passed through flared grooves 126 in guide member 128, the wider openings 146 of grooves 126 being closer to wire carrier 62, and into contact with the exposed end portions 46 of grooved insulator 14. As indicated above, the angle of approach made by the plated wires with respect to the plane of the grooves in the memory plane is previously selected by adjustment of set screw 132. Lateral registration of grooves 124 and 126 with grooves 16 is made with set screw 130.

Figures 5, 6, 7:
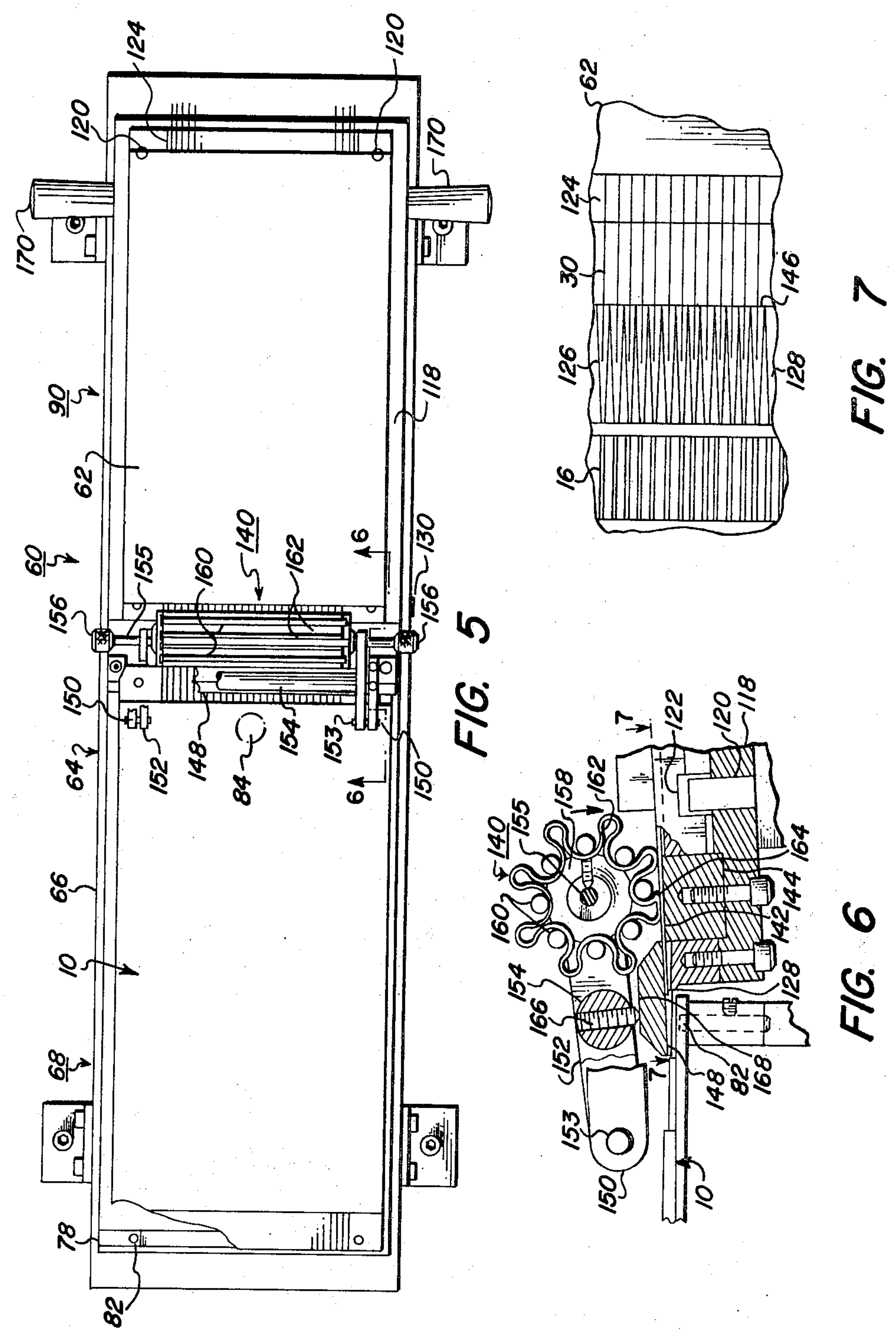
FIG. 5 is a top plan view of the device of FIG. 4, partially broken away to show the various elements adjacent the roller mechanism.
FIG. 6 is a side sectional view of the roller mechanism taken along line 6—6 of FIG. 5.
FIG. 7 is a top plan view taken along line 7—7 of FIG. 6 showing the registration of the memory plane, particularly the grooves in the insulator member associated therewith, the plated wires in the grooves in the wire carrier, and the tapered grooves in the guide member positioned between the memory plane and the plated wire carrier.

Roller mechanism 140 is mounted on support 118 adjacent the edge thereof most closely adjacent memory plane 10. Specifically, bar 148, mounted on support 118 transversely of the direction of travel of the plated wires during insertion, has rigidly mounted thereon arm 150 on each side of the roller mechanism. Inwardly of arms 150, arms 152 are mounted for rotational movement about hinges 153. Bar 154 connects arms 152 for mechanical support. At the ends of arms 152 most closely adjacent wire carrier 62, there is mounted a shaft 155 adapted to be freely rotated, for example by manually rotating handle 156 connected thereto. Mounted on shaft 155 is an annular member 158 having a plurality of rods 160 disposed about the other periphery thereof. Interwoven between rods 160 and annular member 158 is a flexible material 162 adapted to contact the upper surfaces of plated wires 30 when the roller mechanism is in the position as shown in FIG. 6 (i.e., when the roller mechanism is in position to urge the plated wires from the wire carrier into the memory plane). As can best be seen in FIG. 5, the roller mechanism, and the flexible material 162 supported thereby, extends entirely across the width of the grooves in memory plane 10. When in the position as shown in FIG. 6, with the flexible material 162 in contact with the plated wires, the flexible material 162 deforms as shown at 164. The flexible material 162 may be made of soft rubber having a hardness of between 10-40 shore. By properly adjusting the height of roller mechanism 140 by means of set screw 166 operating on the upper surface 168 of horizontal bar 148, sufficient force is applied to the plated wires to urge them out of their grooves 124 in wire carrier 62 and into the grooves 16 in memory plane 10 in registration therewith. After the plated wires have been fully inserted into memory plane 10, by sufficient rotation of roller mechanism 140, the roller mechanism can be rotated, about hinges 153, to the position shown in phantom in FIG. 4. Slight manual pushing of the plated wires further into the grooves in the memory plane positively assures that the plated wires are out of the path of travel of the loading mechanism when it is returned, by manually moving handles 170, to the loading position shown in phantom in the righthand side of FIG. 4, whereby undesirable bending of the plated wires is avoided.

In summary, the present invention provides a plated wire memory plane having a grooved or tunneled insulator which has at least one end thereof exposed such that plated wires can be made to contact against such exposed end, at a slight, acute angle thereto, during the plated wire insertion step. The method of inserting the plated wires at such a slight, acute angle, and the mechanical means therefor, enable the plated wires to be rapidly inserted with a minimum of damage to the magnetic coating on the plated wires. It is estimated that the time to insert the plated wires is decreased by at least an order of magnitude while simultaneously decreasing the possibility for inadvertent damage to the plated wires. Additionally, there is minimum operator contact with the plated wires whereby the possibility of inadvertently damaging or getting dirt, etc. on the magnetic coating is substantially lessened. These features of the present invention eliminate causes for subsequent erratic operation of plated wire memory planes of the type described herein.

It should be understood that the present invention has been described with reference to a presently preferred embodiment thereof and that other equivalent embodiments are presently contemplated. It should further be understood by those skilled in the art that various changes in form and detail may be made without departing from the true spirit and scope of the invention. Accordingly, all substitutions, additions, and/or modifications of the present invention, or to which the present invention is readily susceptible, without departing from the true spirit and scope of this invention, are considered a part thereof.

What is claimed is:

1. A memory plane adapted to receive a plurality of plated wire magnetic storage elements, said memory plane comprising a support member, an insulator supported by one surface of said support member, said insulator having a plurality of parallel grooves formed in the surface thereof remote from said support member, a plurality of conductive word drive lines positioied orthogonally to the longitudinal axes of said grooves, at least a portion of said word drivers overlying the upper, grooved surface of said insulator, at least one end of said grooved insulator longitudinally extending beyond an end of said overlying word drivers thereby presenting exposed end portions of said grooves adapted to receive the leading ends of the plated wires as the plated wires are inserted into said grooves.

2. The memory plane of claim 1 further including a plated wire magnetic storage element in each of said grooves, each of said plated wires comprising an elongated conductive core having an annular ferromagnetic coating disposed about the outer periphery thereof, a bit storage location being defined by each spatial intersection of a word driver with a plated wire.

3. The memory plane of claim 1 further including a plated wire magnetic storage element in certain of said grooves, each of said plated wires comprising an elongated conductive core having an annular ferromagnetic coating disposed about the outer periphery thereof, a bit storage location being defined by each spatial intersection of a word drive line with a plated wire.

4. The memory plane of claim 1 wherein said plurality of word drive lines are supported by a flexible, insulator support member.

5. The memory plane of claim 1 wherein said plurality of word drive lines are formed on a substantially U-shaped flexible support thereby forming a word drive line laminate, a first leg of said laminate being positioned between said support member and said grooved insulator and the second leg of said word drive line laminate being positioned adjacent the non-continuous, grooved surface of said insulator, said plurality of word drive lines being on the side of said flexible support member most closely adjacent the grooves in said insulator which are to receive the plated wires.

6. The memory plane of claim 1 further including means to connect plated wires positioned in said grooves to read-write means, and means to connect said word drive lines to drive means.

7. The memory plane of claim 1 wherein said exposed end portions of said grooves have flared ends with larger openings at the ends thereof remote from said overlying word drive lines.

8. The memory plane of claim 1 wherein both ends of said grooved insulator extend beyond the longitudinal ends of said overlying word drive lines.

9. The memory plane of claim 1 wherein said exposed end portions of said grooves are sufficiently long to present an elongated target for the insertion of plated wires at a slight, acute angle with respect to the plane of said grooves.

* * * * *